US009500231B2

United States Patent
Williams et al.

(10) Patent No.: US 9,500,231 B2
(45) Date of Patent: Nov. 22, 2016

(54) FRACTURED-OUTER-RACE FULL-COMPLEMENT BALL-BEARING SYSTEM INCORPORATED IN A TURBOCHARGER ASSEMBLY

(71) Applicant: WILLIAMS INTERNATIONAL CO., L. L. C., Walled Lake, MI (US)

(72) Inventors: Gregg G. Williams, Walled Lake, MI (US); Craig R. Miller, West Bloomfield, MI (US)

(73) Assignee: WILLIAMS INTERNATIONAL CO., L.L.C., Walled Lake, MI (US)

( * ) Notice: Subject to any disclaimer, the term of this patent is extended or adjusted under 35 U.S.C. 154(b) by 750 days.

(21) Appl. No.: 13/630,602

(22) Filed: Sep. 28, 2012

(65) Prior Publication Data

US 2013/0084035 A1    Apr. 4, 2013

Related U.S. Application Data

(60) Provisional application No. 61/541,739, filed on Sep. 30, 2011.

(51) Int. Cl.
*F16C 33/60*   (2006.01)
*F16C 33/62*   (2006.01)
(Continued)

(52) U.S. Cl.
CPC ............... *F16C 33/62* (2013.01); *F16C 33/32* (2013.01); *F16C 33/60* (2013.01); *F16C 33/6659* (2013.01); *F16C 33/7886* (2013.01); *F16C 2206/40* (2013.01); *F16C 2240/84* (2013.01); *F16C 2360/24* (2013.01)

(58) Field of Classification Search
CPC .................. F16C 35/077; F16C 35/605; F16C 35/063; F16C 35/0635; F16C 33/60; F16C 33/62; F16C 33/32; F16C 33/6659; F16C 33/7886; F16C
USPC ....... 384/503, 502, 505, 537, 538, 570, 465, 384/467, 473
(Continued)

(56) References Cited

U.S. PATENT DOCUMENTS 2,648,578 A    8/1953   Stearns et al.
2,657,105 A    10/1953  Stearns
(Continued)

FOREIGN PATENT DOCUMENTS

EP    1426563 A1   6/2004
EP    1522736 A2   4/2005
GB    1279827 A    6/1972

*Primary Examiner* — Adam D Rogers
*Assistant Examiner* — Yamilka Pinero Medina
(74) *Attorney, Agent, or Firm* — Raggio & Dinnin, P.C.

(57) ABSTRACT

A turbocharger ball-bearing assembly incorporates a cageless set of ceramic bearing balls operating within outer and inner bearing raceways, wherein the outer bearing raceway is on the inside of a fractured outer race. The fractured outer race is located in a counterbore of a center body of a turbocharger. The center body, in cooperation with the ball-bearing assembly, provides for rotationally supporting, and axially restraining, a rotor shaft of the turbocharger. The outside diameter of the fractured outer bearing race is less than a corresponding inside diameter of the counterbore, and the center body provides for supplying lubricant to an isolation annulus therebetween, so as to provide fir squeezefilm damping the ball-bearing assembly within the counterbore.

22 Claims, 6 Drawing Sheets

(51) Int. Cl.
*F16C 33/66* (2006.01)
*F16C 33/32* (2006.01)
*F16C 33/78* (2006.01)

(58) Field of Classification Search
CPC .......................... 2206/40;F16C 2240/84; F16C 2360/24
See application file for complete search history.

(56) References Cited

U.S. PATENT DOCUMENTS

| | | | |
|---|---|---|---|
| 2,702,216 A | | 2/1955 | Stearns |
| 3,004,782 A | * | 10/1961 | Meermans .................... 277/347 |
| 3,546,762 A | | 12/1970 | Martin |
| 3,592,519 A | | 7/1971 | Martin |
| 3,834,772 A | | 9/1974 | Bowen |
| 3,884,406 A | | 5/1975 | Bowen |
| 4,643,595 A | | 2/1987 | Weavers |
| 4,934,837 A | | 6/1990 | Kawamura |
| 5,145,334 A | * | 9/1992 | Gutknecht .................... 417/407 |
| 5,174,733 A | | 12/1992 | Yoshikawa et al. |
| RE34,276 E | * | 6/1993 | Glaser .................... F01D 25/16 384/504 |
| 5,228,786 A | | 7/1993 | Tanimoto et al. |
| 5,423,615 A | | 6/1995 | Hara et al. |
| 6,217,222 B1 | | 4/2001 | Mattson et al. |
| 6,318,899 B1 | | 11/2001 | Boyd |
| 7,134,836 B2 | | 11/2006 | Scherrer |
| 8,545,106 B2 | * | 10/2013 | Miller ................ F16C 33/6659 384/473 |
| 2006/0083448 A1 | * | 4/2006 | Alam et al. .................... 384/99 |
| 2006/0104559 A1 | | 5/2006 | Wingett et al. |
| 2010/0172739 A1 | | 7/2010 | Arnold |
| 2010/0180592 A1 | * | 7/2010 | Williams ............ F01D 17/165 60/602 |
| 2011/0007991 A1 | | 1/2011 | Miller et al. |

\* cited by examiner

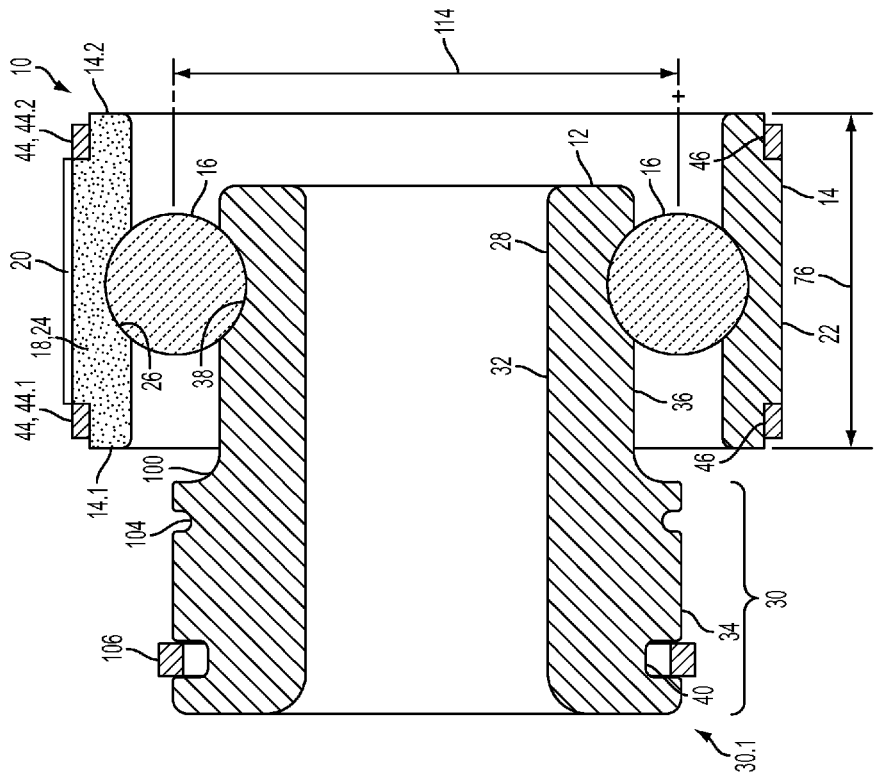
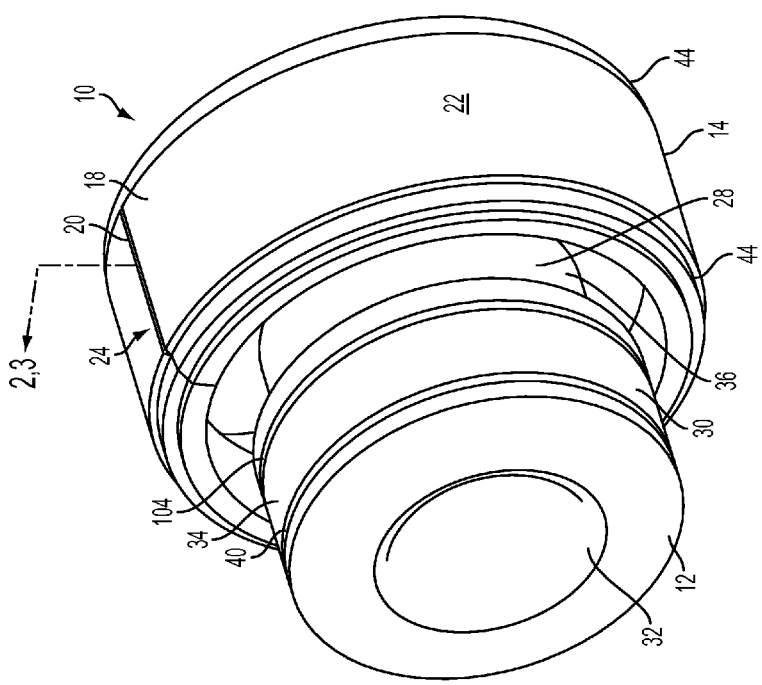
FIG. 2
FIG. 1

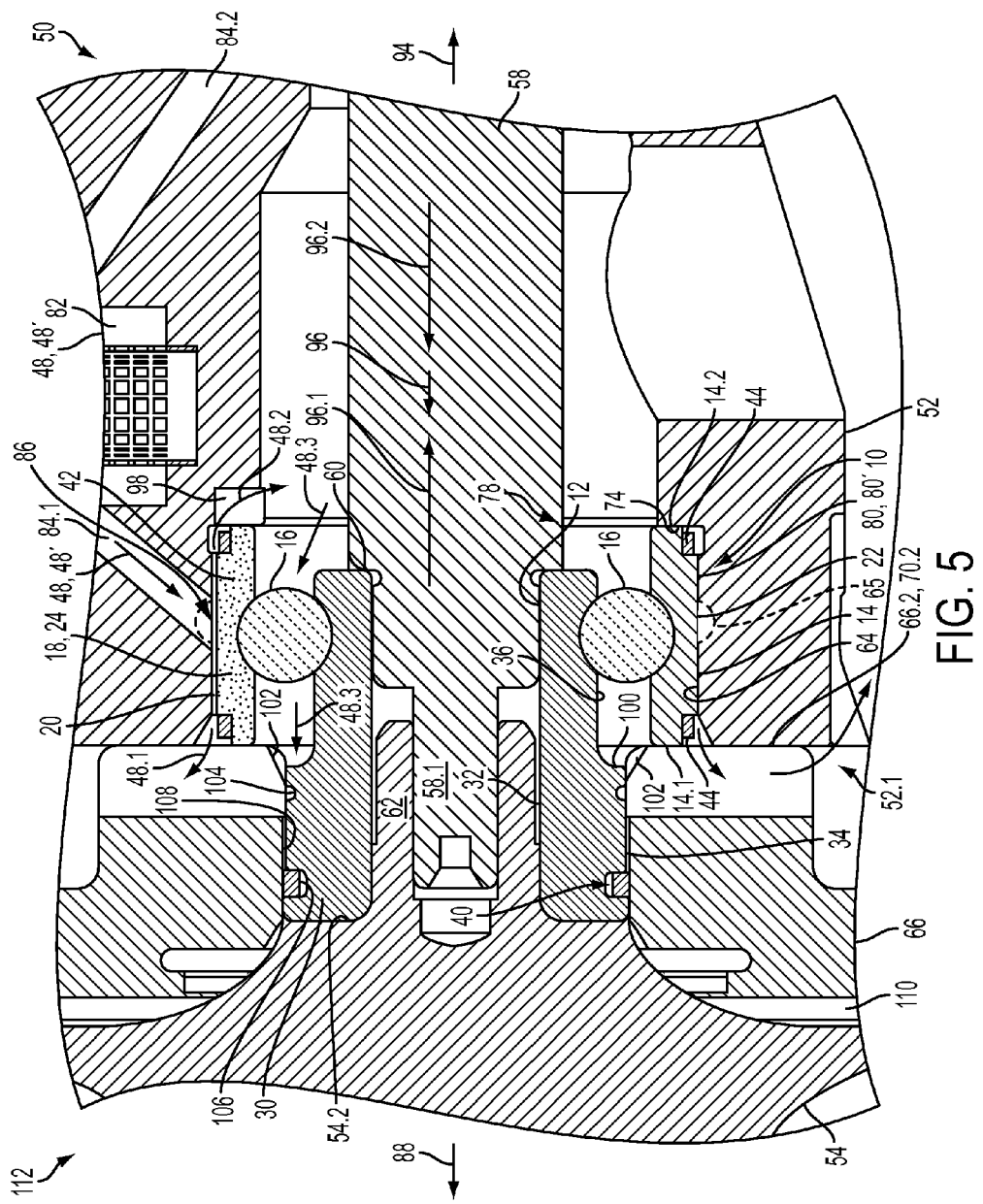

FRACTURED-OUTER-RACE FULL-COMPLEMENT BALL-BEARING SYSTEM INCORPORATED IN A TURBOCHARGER ASSEMBLY

CROSS-REFERENCE TO RELATED APPLICATIONS

The instant application claims the benefit of prior U.S. Provisional Application Ser. No. 61/541 739 filed on 30 Sep. 2011.

BRIEF DESCRIPTION OF THE DRAWINGS

In the accompanying drawings:

FIG. 1 illustrates an isometric view of a ball-bearing assembly incorporating a fractured outer race, removed from an associated turbocharger assembly;

FIG. 2 illustrates a cross-sectional view of the ball-bearing assembly illustrated in FIG. 1 incorporating a fractured outer race, removed from the associated turbocharger assembly;

FIG. 5 illustrates an expanded portion of the cross-sectional view illustrated in FIG. 4;

DESCRIPTION OF EMBODIMENT(S)

Figure 3:
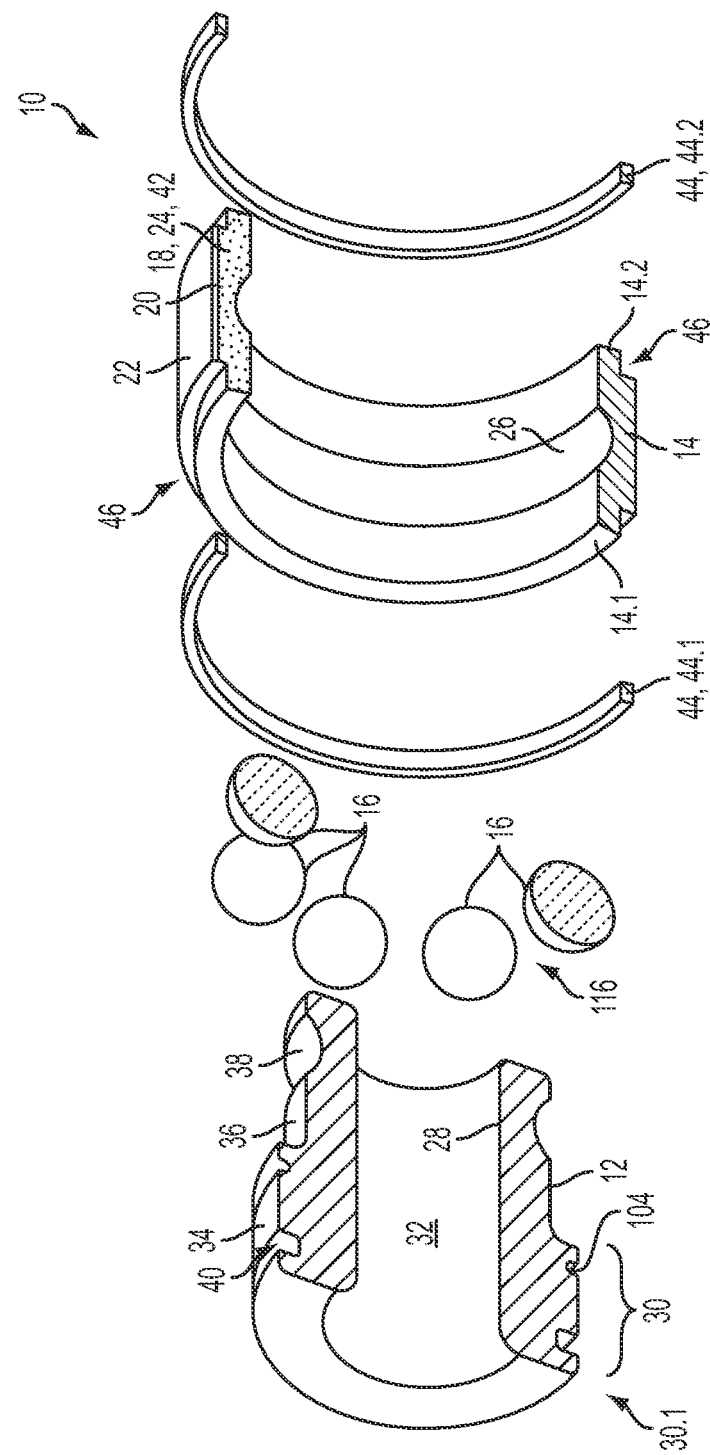
FIG. 3 illustrates an exploded cross-sectional view of the ball-bearing assembly illustrated in FIGS. 1-2.

Referring to FIGS. 1-3, a ball-bearing assembly 10 comprises an inner race 12, a fractured outer race 14, and a full complement of ceramic bearing balls 16 therebetween, absent an associated bearing cage that might otherwise be used in a conventional ball bearing.

The fractured outer race 14 is constructed of a relatively-brittle high-speed bearing material 18, for example, bearing steel. The fractured outer race 14 incorporates an axially-oriented fracture-inducing notch 20 on the outer cylindrical surface 22 thereof, wherein, for example, the fractured outer race 14 is created by expanding a corresponding unfractured outer race until the resulting associated concentrated stresses across a radial section of the unfractured outer race at the fracture-inducing notch 20 exceed the ultimate breaking strength of the relatively-brittle high-speed bearing material 18, causing a resulting fracture 24 thereof, for example, as described in U.S. Pat. No. 2,648,578, which is incorporated herein by reference. The associated outer cylindrical surface 22 and outer bearing raceway 26 may be ground either before or after the fractured outer race 14 is fractured, but typically before fracturing so as to minimize vibration during associated finishing operations.

The ceramic bearing balls 16 are constructed from a ceramic bearing material, for example, silicon nitride or silicon carbide. For a given size, ceramic bearing balls 16 generally exhibit a smaller polar moment of inertia than do corresponding steel bearing balls, which provides for relatively lower resulting gyroscopically-induced loads that result when the spin axis of the ceramic bearing balls 16 is changed responsive to changes in loading of the ball-bearing assembly 10. Ceramic bearing balls 16 also have a higher modulus of elasticity and therefore have less deflection and hysteresis losses from rolling, and as a result, generate less friction. Furthermore, relative to steel bearing balls, ceramic bearing balls 16 exhibit a lower coefficient of friction and substantially no adhesive wear, and generally require less coolant and lubricant during operation thereof.

The inner race 12 is constructed of a high speed bearing material 28, for example, either bearing steel or a ceramic bearing material. The inner race 12 incorporates a forward annular extension 30 that shares a common cylindrical bore 32, and that incorporates an outer cylindrical surface 34 having a relatively larger diameter than the corresponding outside diameter of an associated aft portion 36 proximally adjacent to the associated inner bearing raceway 38 of the inner race 12. The outer cylindrical surface 34 incorporates a sealing-ring groove 40 proximate to the forward end 30.1 of the forward annular extension 30, as will be described more fully hereinbelow. Generally, the forward annular extension 30 could either be integral with the inner race 12 as illustrated, or could comprise one or more separate rings that abut one another, and which collectively abut a forward face of the inner race 12.

Figure 6:
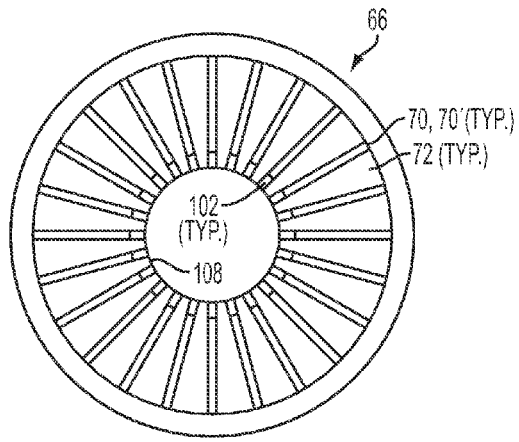
FIG. 6 illustrates a plan view of an aft side of a bearing retainer incorporated in the turbocharger assembly illustrated in FIGS. 4 and 5, incorporating radial ribs.

The ball-bearing assembly 10 is assembled by either sufficiently expanding the fractured outer race 14 so as to provide for inserting the ceramic bearing balls 16 in the resulting opening between the corresponding fractured surfaces 42, for example, as illustrated in FIG. 6 of U.S. Pat. No. 2,648,578, or by pressing the fractured outer race 14 over the ceramic bearing balls 16 assembled on the inner race 12, for example, as illustrated in U.S. Pat. No. 2,702,216, particularly in FIGS. 3 and 3a, which is incorporated by reference in its entirety. After the ceramic bearing balls 16 are inserted between the outer 26 and inner 38 bearing raceways, the fractured outer race 14 is held together in its original size and form—i.e. the size and form prior to fracturing—with a pair of retention bands 44, 44.1, 44.2, for example, that are secured by interference fit onto corresponding rabbeted circular grooves 46 rabbeted into the outer cylindrical surface 22 on both sides of the fractured outer race 14. Alternatively, the outer cylindrical surface 22 of the fractured outer race 14 could be located within a singular retention tube—for example, either a sleeve or bushing fitted with an interference fit over the outer cylindrical surface 22—that provides for holding the fractured outer race 14 together in its original size and form, without requiring the separate retention bands 44 or rabbeted circular grooves 46. Generally, the retention bands 44 or alternative tube, sleeve or bushing will be referred to herein as at least one retention ring—within which the fractured outer race 14 is installed with an interference fit—that provides for maintaining the original geometry of the fractured outer race 14 so as to prevent the fractured surfaces 42 from opening during operation of the ball-bearing assembly 10.

The outer 26 and inner 38 bearing raceways provide for reacting against thrust loads in either a fore or aft axial direction, and the associated fractured outer race 14 provides for this without otherwise requiring either a relatively-more-costly split inner race and/or split outer race, and without otherwise requiring the associated relatively complex assembly thereof in the associated ball-bearing assembly.

Absent an associated bearing cage, light or heavy thrust loads when reacted though metal bearing balls can cause the associated metal bearing balls to contact one another potentially resulting in a material transfer—referred to as micro-welding—therebetween, which can eventually lead to a bearing failure. Accordingly, when using metal bearing balls, a bearing cage—typically made from a different material than that of the associated bearing balls—is typically used to separate the metal bearing balls in high speed bearing assemblies. A bearing cage would typically have a relatively low hardness—i.e. relatively soft—and might incorporate a soft coating so as to not scratch the metal bearing balls. However, relatively soft bearing cases can become embedded with relatively hard particles that can then causing the metal bearing balls and associated outer 26 and inner 38 bearing raceways to become scratched.

Experimentation has shown that hydrodynamic forces from the bearing lubricant 48, e.g. oil 48', alone—i.e. without an associated bearing cage—are sufficient to minimize the contact forces in a relatively lightly loaded ball-bearing assembly 10. In combination with the use of ceramic bearing balls 16—which do not "mirco-weld"—a lubricated cageless configuration has been shown to have adequate bearing life. By operating without a bearing cage, the cageless ball-bearing assembly 10 is relatively easier to lubricate and is not subject to failure from the above-described scratching that might otherwise result if relatively hard particles became otherwise embedded in a relatively soft surface of a bearing cage had a bearing cage been used. Furthermore, the cageless ball-bearing assembly 10 provides for relatively less parasitic drag, less heat generation, and better oil circulation within the ball-bearing assembly 10, relative to a corresponding configuration using a bearing cage. Accordingly, referring to FIGS. 4 and 5, when used in a turbocharger 50, these features provide for faster associated turbocharger response times.

By not incorporating a bearing cage, the cageless ball-bearing assembly 10 provides for using what is known as a full complement of ceramic bearing balls 16, i.e. the maximum number or packing of ceramic bearing balls 16 that can fit along the outer 26 and inner 38 bearing raceways—which is a greater number or packing of ceramic bearing balls 16 than could otherwise have been used with an associated bearing cage. The relatively greater number of ceramic bearing balls 16, or a same number of relatively larger ceramic bearing balls 16, provides for a relatively greater load-bearing capacity, which provides for a relatively greater bearing life.

Figure 4:
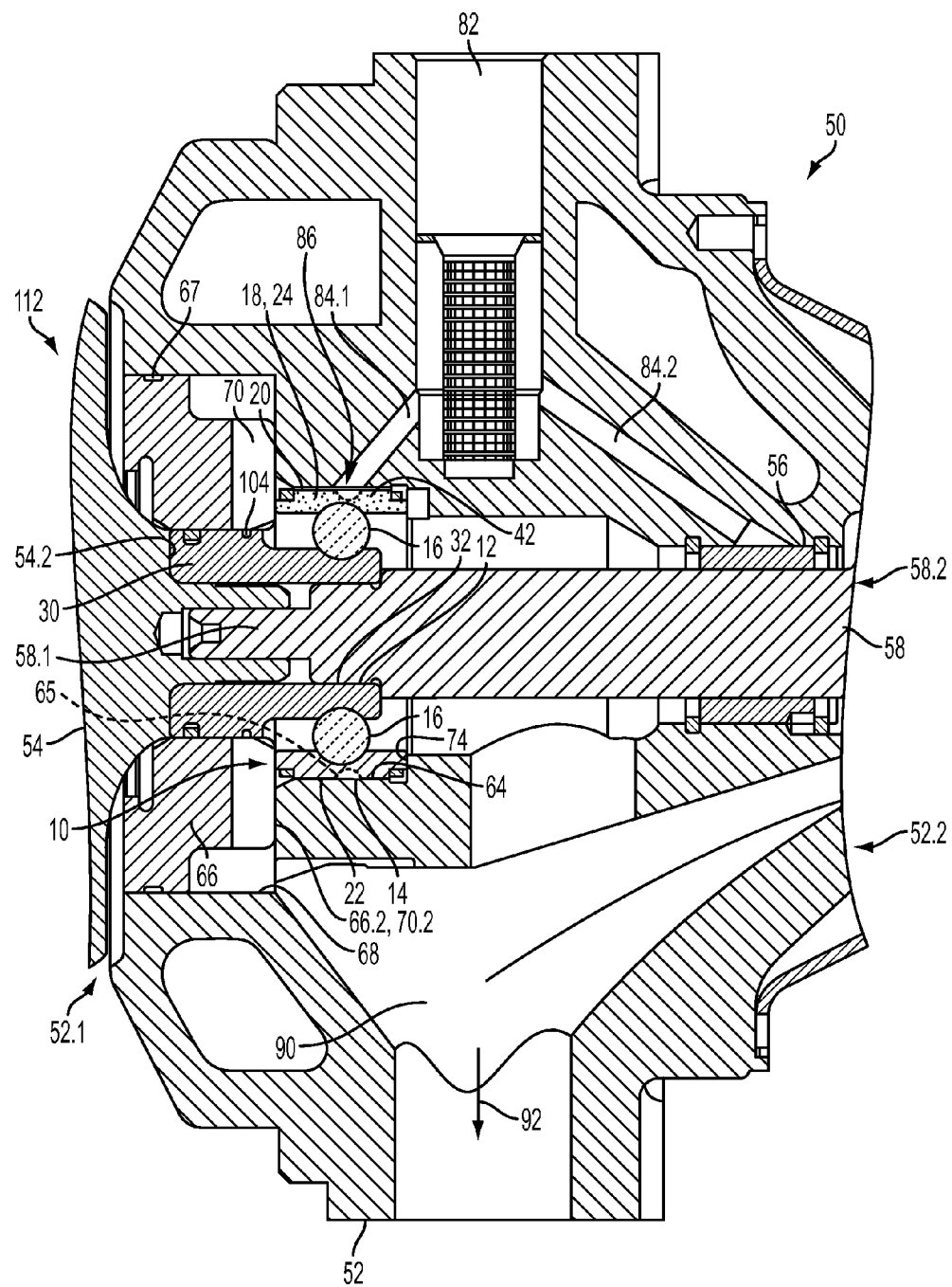
FIG. 4 illustrates a cross-sectional view of a turbocharger assembly incorporating the ball-bearing assembly illustrated in FIGS. 1-3 incorporating a fractured outer race.

Referring to FIGS. 4 and 5, the ball-bearing assembly 10 is illustrated installed in a forward side 52.1 of a center body 52 of a turbocharger 50, proximate to an associated compressor rotor 54, in cooperation with a corresponding journal bearing 56 installed in the aft side 52.2 of the center body 52 proximate to an associated turbine rotor (not illustrated), wherein the ball-bearing assembly 10 and journal bearing 56 together support an associated rotor shaft 58 at relatively forward and aft portions thereof, with an aft extension 62 of the compressor rotor 54 operatively coupled to the forward end 58.1 of the rotor shaft 58, and the turbine operatively coupled to the aft end 58.2 of the rotor shaft 58, so as to provide for the rotor shaft 58 to rotate relative to the center body 52. The ball-bearing assembly 10 provides for reacting thrust in either axial direction—fore or aft. Accordingly, the other bearing supporting the rotor shaft 58, e.g. the journal bearing 56, need not support thrust loads. For example, alternatively, the other bearing could be a roller bearing rather than a journal bearing 56 as illustrated. Furthermore, it should be understood that the ball-bearing assembly 10 could be located proximate to the turbine rotor, with the other bearing proximate to the compressor rotor 54.

The inner race 12 is clamped between an aft face 54.2 of the compressor rotor 54 and a shoulder portion 60 of the rotor shaft 58, thereby providing for the ball-bearing assembly 10 to provide for axially locating the rotor shaft 58—and the compressor rotor 54 and turbine rotor coupled thereto—relative to the center body 52. The fractured outer race 14—with associated retention bands 44, 44.1, 44.2—is located in a first counterbore 64 on the forward side 52.1 of the center body 52, and is retained therein with a bearing retainer 66 pressed into, and sealed with respect to—for example, with an associated seal 67,—a second counterbore 68 on the forward side 52.1 of the center body 52, forward of the first counterbore 64, wherein an inside diameter of the second counterbore 68 exceeds that of the first counterbore 64. The outside diameters of the associated retention bands 44, 44.1, 44.2 are configured so that each retention band 44, 44.1, 44.2 has sufficient clearance with respect to the corresponding inside diameter of the first counterbore 64 so as to provide for relative radial motion therebetween during an associated squeeze-film damping process. For example, in one set of embodiments, the outside diameter of at least the aft retention band 44, 44.2, and typically of each retention band 44, 44.1, 44.2, is less than the outside diameter of the fractured outer race 14.

Figure 7:
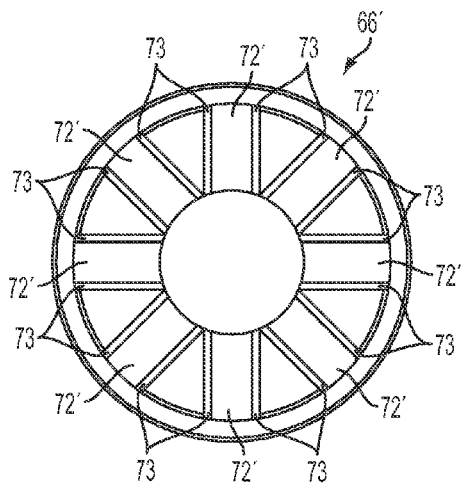
FIG. 7 illustrates a plan view of an aft side of a first alternative embodiment of a bearing retainer, incorporating radial slots.
Figure 8:
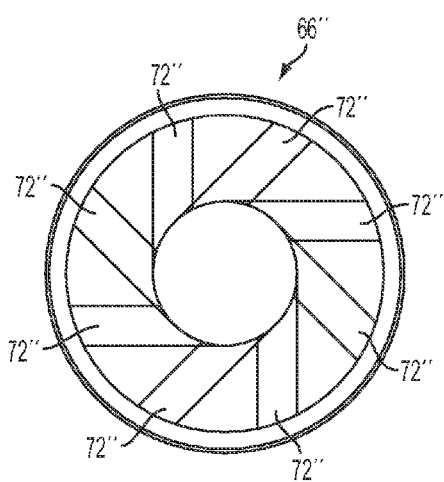
FIG. 8 illustrates a plan view of an aft side of a second alternative embodiment of a bearing retainer, incorporating tangential slots.
Figure 9:
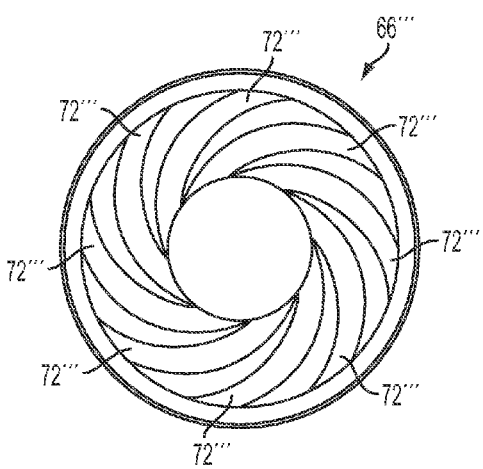
FIG. 9 illustrates a plan view of an aft side of a third alternative embodiment of a bearing retainer, incorporating spiral slots.

Referring also to FIG. 6, the aft side 66.2 of the bearing retainer 66 comprises a plurality of ribs 70, for example, substantially radially-oriented ribs 70', for example, formed by milling corresponding slots 72 on the aft side 66.2 of the bearing retainer 66. The aft surface 70.2 of the ribs 70 is proximally adjacent to the forward surface 14.1 of the fractured outer race 14, so that the fractured outer race 14 is axially positioned between the aft surface 70.2 of the ribs 70 and a forward surface 74 of the center body 52 abutting, and defining the depth of, the first counterbore 64. Examples of various alternative geometries of the slots 72 in the bearing retainer 66 are illustrated in FIGS. 7-9. For example, FIG. 7 illustrates a first alternative embodiment of a bearing retainer 66' incorporating substantially radially-oriented slots 72' (incorporating associate fillets 73 at the bases thereof); FIG. 8 illustrates a second alternative embodiment of a bearing retainer 66" incorporating substantially tangentially-oriented slots 72"; and FIG. 9 illustrates a third alternative embodiment of a bearing retainer 66''', incorporating spiral slots 72'''.

Although the inner race 12 has been illustrated with a cylindrical bore 32 that cooperates with an associated rotor shaft 58, it should be understood that alternatively, the inner race 12 could be integral with rotor shaft 58, with the associated inner bearing raceway 38 ground directly on the outside of the rotor shaft 58.

The separation between the aft surface 70.2 of the ribs 70 and the forward surface 74 of the center body 52 is greater than or equal to the axial width 76 of the fractured outer race 14, for example, by an axial gap 78, for example, in one embodiment, ranging from line-to-line to about 127 microns (0.005 inches), so that the fractured outer race 14 is axially loose therebetween, or at least not clamped therebetween. Generally, the particular dimension of the axial gap 78 will depend upon the particular application and associated tolerances. For example, in the environment of a turbocharger 50, the dimension of the axial gap 78 is dependent upon the associated acceptable tolerances on the axial location of the compressor rotor 54 and turbine rotor within their respective housings. Furthermore, referring also to FIG. 5a, the outside diameter of the outer cylindrical surface 22 of the fractured outer race 14 is less than the inside diameter of the first counterbore 64 by a sufficient amount so that the ratio of the associated resulting diametrical gap to the outside diameter of the outer cylindrical surface 22 of the fractured outer race 14 is in a range of about 0.0005 to about 0.0050, so as to provide for a radial gap 80 therebetween defining an associated isolation annulus 80' around the outer cylindrical surface 22 of the fractured outer race 14.

The center body 52 incorporates a lubricant supply plenum 82 that provides for distributing bearing lubricant 48, e.g. oil 48',—supplied from an external source—to the ball-bearing assembly 10 and the journal bearing 56 via corresponding associated first 84.1 and second 84.2 conduits.

During operation of the turbocharger 50 and the associated ball-bearing assembly 10, bearing lubricant 48, 48' is supplied to the isolation annulus 80' from the lubricant supply plenum 82 via the first conduit 84.1. The fractured outer race 14 is free to rotate within the first counterbore 64, albeit relatively slowly, responsive to a relatively fast rotation of the rotor shaft 58 driven by the turbine rotor. The rotation of the fractured outer race 14 within the first counterbore 64 provides for distributing the bearing lubricant 48, e.g. oil 48', within the isolation annulus 80'. Alternatively, either the inner cylindrical surface 64' of the first counterbore 64, or the outer cylindrical surface 22 of the fractured outer race 14, could incorporate a circumferential groove 65 axially aligned with the discharge port 86 of the first conduit 84.1 so as to provide for, or assist with, the distribution of bearing lubricant 48, 48' within the isolation annulus 80'.

A first portion 48.1 of the bearing lubricant 48, 48' is discharged in a forward direction 88 from the isolation annulus 80', into the slots 72 between the ribs 70, 70' on the aft side 66.2 of the bearing retainer 66, and then collected within an associated oil sump 90 within the center body 52, and discharged 92 therefrom by action of gravity. The oil-filled isolation annulus 80' provides for at least partially mechanically isolating the ball-bearing assembly 10 from the center body 52 with respect to vibrations of the rotor shaft 58 and associated elements of the turbocharger 50 that rotate therewith, for example, by action of what is known as squeeze-film damping.

A second portion 48.2 of the bearing lubricant 48, 48' is discharged in an aft direction 94 from the isolation annulus 80', and then radially inwards, either through the axial gap 78 between the aft surface 14.2 of the fractured outer race 14 and the forward surface 74 of the center body 52—for example, if and when the net axial thrust load 96 on the rotor shaft 58 is in a forward direction 88 causing the fractured outer race 14 to be biased towards the bearing retainer 66—or via a notch 98 in the forward surface 74 of the center body 52—for example, substantially exclusively if and when the net axial thrust load 96 on the rotor shaft 58 is in an aft direction 94 causing, the aft surface 14.2 of the fractured outer race 14 to be biased against the forward surface 74 of the center body 52. Thereafter, at least a portion 48.3 of the second portion 48.2 of the bearing lubricant 48, 48' splashes off the rotor shaft 58 towards the ball-bearing assembly 10 so as to provide for lubricating the ceramic bearing balls 16 and the associated outer 26 and inner 38 bearing raceways, after which the portion 48.3 of the second portion 48.2 of the bearing lubricant 48, 48' is discharged generally in a forward direction 88 either a) directly into the slots 72 between the ribs 70, 70' on the aft side 66.2 of the bearing retainer 66, b) against an aft lip surface 100—facing the inner race 12—of the forward annular extension 30, or c) onto portions of a chamfered surface 102—that otherwise provides for compressing an associated below—described piston-ring seal 106 during assembly of the turbocharger 50—on radially-inward and axially-aftward portions of the ribs 70. The outer cylindrical surface 34 of the forward annular extension 30 of the inner race 12 incorporates a lubricant-slinger-groove 104—located between the sealing-ring groove 40 and aft lip surface 100—that provides for slinging—in a radially-outward direction—portions of the bearing lubricant 48, 48' impinging thereon, as does the aft lip surface 100. Thereafter, the portion 48.3 of he second portion 48.2 of the bearing lubricant 48, 48' is then collected within the associated oil sump 90 within the center body 52, and discharged 92 therefrom by action of gravity.

In order to provide for a relatively lightly loaded ball-bearing assembly 10, the axial thrust load components 96.1, 96.2 from the compressor rotor 54 and turbine rotor, respectively, are substantially balanced so as to provide for a relatively low net axial thrust load 96 on the ball-bearing assembly 10 at at least one operating condition of the turbocharger 50—for example, under a relatively high power operating condition—or, if possible, over a range of operating conditions, for example, by selection the size of the compressor rotor 54 and turbine rotor in combination with the associated aerodynamics thereof.

The journal bearing 56 located proximate to the turbine rotor is configured with relatively high-temperature-compatible materials that are compatible with the relatively high temperatures experienced during operation and shutdown of the turbocharger 50, and is cooled with a relatively high flow of bearing lubricant 48, 48', for example, at least a substantial portion of which is delivered from the lubricant supply plenum 82 via the second conduit 84.2. The ball-bearing assembly 10 located proximate to the relatively cool compressor rotor 54 remains relatively cool—in comparison with the journal bearing 56—during operation and shutdown of the turbocharger 50, and therefore the inner 12 and outer 14 races can each be constructed of relatively low cost bearing steel.

A piston-ring seal 106 operative in the sealing-ring groove 40 on the outer cylindrical surface 34 of the forward annular extension 30 of the inner race 12 provides for sealing against a central bore 108 in the bearing retainer 66, so as to provide for substantially preventing an inward leakage of compressed air 110 from the compressor 112 towards the center body 52, and substantially preventing an outward leakage of bearing lubricant 48, 48' from the center body 52, the latter of which is in cooperation with the lubricant-slinger-groove 104 on the forward annular extension 30 that provides for radially-outwardly slinging bearing lubricant 48, 48' so as to substantially limit the amount of bearing lubricant 48, 48' that might otherwise be available to wick into the annulus between the forward annular extension 30 and the central bore 108 in the bearing retainer 66, and then onto the piston-ring seal 106.

The pitch diameter 114 of the outer 26 and inner 38 bearing raceways—i.e. the diameter of a circle extending though the center of the ceramic bearing balls 16 when installed between the outer 26 and inner 38 bearing raceways—is configured in cooperation with the diameter of the associated ceramic bearing balls 16 so that when evenly spaced, the nominal separation 116 between adjacent ceramic bearing balls 16 is equal to or greater than about 254 microns (0.010 inches) plus about 0.0005 times the associated pitch diameter in microns (inches), so as to provide for sufficient spacing between the ceramic bearing balls 16 so as to accommodate excursion thereof as a result of associated radial load and/or misalignment.

In relation to a journal bearing 56, the ball-bearing assembly 10 provides relatively longer life, reduced parasitic losses, and better control of associated tip clearances of the compressor rotor 54 and turbine rotor, resulting in improved operating efficiency of the turbocharger 50. The combination of a cageless set of ceramic bearing balls 16 in cooperation with a fractured outer race 14 in the ball-bearing assembly 10, operating at a relatively low net axial thrust load 96, provides for a rolling-element bearing to be incorporated in a turbocharger 50 at a marketable cost.

While specific embodiments have been described in detail in the foregoing detailed description and illustrated in the accompanying drawings, those with ordinary skill in the art will appreciate that various modifications and alternatives to those details could be developed in light of the overall teachings of the disclosure. It should be understood, that any reference herein to the term "or" is intended to mean an "inclusive or" or what is also known as a "logical OR", wherein when used as a logic statement, the expression "A or B" is true if either A or B is true, or if both A and B are true, and when used as a list of elements, the expression "A, B or C" is intended to include all combinations of the elements recited in the expression, for example, any of the elements selected from the group consisting of A, B, C, (A, B), (A, C), (B, C), and (A, B, C); and so on if additional elements are listed. Furthermore, it should also be understood that the indefinite articles "a" or "an", and the corresponding associated definite articles "the" or "said", are each intended to mean one or more unless otherwise stated, implied, or physically impossible. Yet further, it should be understood that the expressions "at least one of A and B, etc.", "at least one of A or B, etc.", "selected from A and B, etc." and "selected from A or B, etc." are each intended to mean either any recited element individually or any combination of two or more elements, for example, any of the elements from the group consisting of "A", "B", and "A AND B together", etc. Yet further, it should be understood that the expressions "one of A and B, etc." and "one of A or B, etc." are each intended to mean any of the recited elements individually alone, for example, either A alone or B alone, etc., but not A AND B together. Furthermore, it should also be understood that unless indicated otherwise or unless physically impossible, that the above-described embodiments and aspects can be used in combination with one another and are not mutually exclusive. Accordingly, the particular arrangements disclosed are meant to be illustrative only and not limiting as to the scope of the invention, which is to be given the full breadth of the appended claims, and any and all equivalents thereof.

What is claimed is:

1. A cageless full-complement ball-bearing system incorporated in a turbocharger assembly, comprising:
   a. a fractured outer bearing race, wherein said fractured outer bearing race is fractured along an associated fracture extending across a circumferential extent of said fractured outer bearing race, and said fractured outer bearing race incorporates an outer bearing raceway capable of reacting an associated thrust force regardless of axial direction thereof;
   b. an inner bearing race, wherein said inner bearing race incorporates an inner bearing raceway capable of reacting said associated thrust force regardless of axial direction thereof;
   c. a plurality of ceramic bearing balls interposed between said inner bearing race and said fractured outer bearing race on said outer and inner bearing raceways, wherein said plurality of ceramic bearing balls provide for transferring said associated thrust force between said inner bearing race and said fractured outer bearing race, a size and number of said plurality of ceramic bearing balls is configured in cooperation with a geometry of said outer and inner bearing raceways so that said plurality of ceramic bearing balls constitute a full complement, and said fracture of said fractured outer bearing race provides for opening said fractured outer bearing race and inserting said plurality of ceramic bearing balls between said outer and inner bearing raceways;
   d. at least one retention ring extending around said fractured outer bearing race with a corresponding interference fit relative thereto so as to prevent said fracture from opening during operation of said cageless full-complement ball-bearing system;
   e. said turbocharger assembly comprising:
      i. a center body;
      ii. a rotor shaft rotationally supported from said center body and axially restrained thereby;
      iii. a compressor rotor operatively coupled to a forward end of said rotor shaft; and
      iv. a turbine rotor operatively coupled to an aft end of said rotor shaft, wherein said cageless full-complement ball-bearing system is incorporated in said center body of said turbocharger assembly so as to provide for axially restraining said rotor shaft relative thereto, and in cooperation with at least one other bearing, provides rotational support to said rotor shaft from said center body; said fractured outer bearing race is located in a first counterbore on a forward side of said center body, an outside diameter of said fractured outer bearing race is less than a corresponding inside diameter of said first counterbore, said center body incorporates at least one lubricant supply conduit that provides for supplying a lubricant to an isolation annulus between said fractured outer bearing race and said first counterbore, and said isolation annulus when supplied with said lubricant during operation of said turbocharger assembly provides for squeeze-film damping of said cageless full-complement ball-bearing system within said first counterbore; and
   f. a bearing retainer located in a second counterbore on said forward side of said center body, wherein said second counterbore is located forward of said first counterbore, said second counterbore is sealed to said bearing retainer so as to prevent a flow of said lubricant therebetween, and an aft surface of said bearing retainer provides for limiting a forward movement of said fractured outer bearing race within said first counterbore.

2. A cageless full-complement ball-bearing system incorporated in a turbocharger assembly as recited in claim 1, further comprising a forward annular extension of said inner bearing race either integral with or abutting said inner bearing race, wherein a diameter of said forward annular extension of said inner bearing race is greater than a diameter of said inner bearing race adjacent to said inner bearing raceway so as to provide for a lip surface facing said inner bearing raceway, and said forward annular extension of said inner bearing race comprises:

a. at least one circumferential external sealing-ring groove on said forward annular extension of said inner bearing race configured to cooperate with at least one corresponding seal operative therein so as to prevent a flow of said lubricant forward of said at least one circumferential external sealing-ring groove during operation of said cageless full-complement ball-bearing system in said turbocharger assembly, and b. at least one circumferential external lubricant-slinging groove on said forward annular extension of said inner bearing race located axially between said lip surface and said at least one circumferential external sealing-ring groove so as to provide for slinging said lubricant radially outwards during operation of said cageless full-complement ball-bearing system in said turbocharger assembly.

3. A cageless full-complement ball-bearing system incorporated in a turbocharger assembly as recited in claim 1, wherein said size and number of said plurality of ceramic bearing balls is configured in cooperation with said geometry of said outer and inner bearing raceways so that said plurality of ceramic bearing balls when evenly spaced along said outer and inner bearing raceways are each separated by a gap that is greater than or equal to 254 microns (0.010 inches) plus 0.05 percent of an associated pitch diameter in microns (inches).

4. A cageless full-complement ball-bearing system incorporated in a turbocharger assembly as recited in claim 1, wherein said at least one retention ring comprises a first and a second retention band, said fractured outer bearing race comprises a first rabbeted cylindrical groove on an aft end of an outer cylindrical surface of said fractured outer bearing race, said first retention band is installed over said first rabbeted cylindrical groove with a first interference fit, and said second retention band is installed over a forward end of said fractured outer bearing race with a second interference fit.

5. A cageless full-complement ball-bearing system incorporated in a turbocharger assembly as recited in claim 4, wherein an outer diameter of said first retention band is less than or equal to a maximum outer diameter of said fractured outer bearing race.

6. A cageless full-complement ball-bearing system incorporated in a turbocharger assembly as recited in claim 5, wherein said fractured outer bearing race comprises a second rabbeted cylindrical groove on a forward end of said outer cylindrical surface thereof, and said second retention band is installed over said second rabbeted cylindrical groove with said second interference fit.

7. A cageless full-complement ball-bearing system incorporated in a turbocharger assembly as recited in claim 1, wherein said inner bearing race and a forward annular extension thereof are clamped between an aft face of said compressor rotor and a shoulder on a forward portion of said rotor shaft so as to provide for axially-locating the rotor shaft relative to the center body.

8. A cageless full-complement ball-bearing system incorporated in a turbocharger assembly as recited in claim 1, wherein said outside diameter of said fractured outer bearing race is less than said corresponding inside diameter of said first counterbore by an amount that is within the range of 0.05 percent to 0.5 percent of said outside diameter of said fractured outer bearing race.

9. A cageless full-complement ball-bearing system incorporated in a turbocharger assembly as recited in claim 1, wherein said fractured outer bearing race is free to rotate within said isolation annulus.

10. A cageless full-complement ball-bearing system incorporated in a turbocharger assembly as recited in claim 1, wherein an inside of said first counterbore incorporates a circumferential groove axially aligned with said at least one lubricant supply conduit so as to provide for distributing said lubricant within said isolation annulus.

11. A cageless full-complement ball-bearing system incorporated in a turbocharger assembly as recited in claim 1, wherein a separation between said aft surface of said bearing retainer and a forward surface of said first counterbore exceeds a corresponding axial width of said fractured outer bearing race by an amount within the range of zero to 127 microns (0.005 inches).

12. A cageless full-complement ball-bearing system incorporated in a turbocharger assembly as recited in claim 1, wherein an inside diameter of said second counterbore is greater than said inside diameter of said first counterbore.

13. A cageless full-complement ball-bearing system incorporated in a turbocharger assembly as recited in claim 1, wherein said bearing retainer is pressed into said second counterbore with an interference fit therebetween.

14. A cageless full-complement ball-bearing system incorporated in a turbocharger assembly as recited in claim 1, further comprising a forward annular extension of said inner bearing race either integral with or abutting said inner bearing race, wherein a diameter of said forward annular extension of said inner bearing race is greater than a diameter of said inner bearing race adjacent to said inner bearing raceway so as to provide for a lip surface facing said inner bearing raceway, said forward annular extension of said inner bearing race comprises at least one circumferential external sealing-ring groove on said forward annular extension of said inner bearing race configured to cooperate with at least one corresponding seal operative therein so as to prevent a flow of said lubricant forward of said at least one circumferential external sealing-ring groove during operation of said cageless full-complement ball-bearing system in said turbocharger assembly, and said bearing retainer incorporates a central bore within which is located at least a portion of said forward annular extension of said inner bearing race.

15. A cageless full-complement ball-bearing system incorporated in a turbocharger assembly as recited in claim 14, further comprising at least one piston-ring seal operative within said at least one circumferential external sealing-ring groove, configured to cooperate with said central bore in said bearing retainer so as to prevent said flow of said lubricant forward of said at least one circumferential external sealing-ring groove during operation of said cageless full-complement ball-bearing system in said turbocharger assembly.

16. A cageless full-complement ball-bearing system incorporated in a turbocharger assembly as recited in claim 14, wherein an aft side of said bearing retainer incorporates at least one slot that provides for said lubricant from said cageless full-complement ball-bearing system to flow into a lubricant sump within said center body.

17. A cageless full-complement ball-bearing system incorporated in a turbocharger assembly as recited in claim 16, wherein said at least one slot is oriented at least in part in a radial direction.

18. A cageless full-complement ball-bearing system incorporated in a turbocharger assembly as recited in claim

16, wherein said at least one slot is oriented at least in part in a tangential direction relative to said central bore within said bearing retainer.

19. A cageless full-complement ball-bearing system incorporated in a turbocharger assembly as recited in claim 16, wherein said at least one slot at least in part follows a spiral path from said central bore to an inside of said second counterbore.

20. A cageless full-complement ball-bearing system incorporated in a turbocharger assembly as recited in claim 1, wherein a forward-facing surface of said first counterbore incorporates at least one notch or groove that provides for a portion of said lubricant to flow at least partially radially inwards from said isolation annulus towards and onto said rotor shaft, and said forward-facing surface of said first counterbore abuts an aft surface of said fractured outer bearing race when said fractured outer bearing race is biased aftwards in said first counterbore.

21. A cageless full-complement ball-bearing system incorporated in a turbocharger assembly as recited in claim 1, wherein said cageless full-complement ball-bearing system is located along said rotor shaft proximate to said compressor rotor, and said at least one other bearing comprises at least one of a journal bearing or a roller bearing along said rotor shaft proximate to said turbine rotor.

22. A cageless full-complement ball-bearing system incorporated in a turbocharger assembly as recited in claim 1, wherein said cageless full-complement ball-bearing system is located along said rotor shaft proximate to said turbine rotor, and said at least one other bearing comprises at least one of a journal bearing or a roller bearing along said rotor shaft proximate to said compressor rotor.

* * * * *

UNITED STATES PATENT AND TRADEMARK OFFICE
CERTIFICATE OF CORRECTION

PATENT NO. : 9,500,231 B2
APPLICATION NO. : 13/630602
DATED : November 22, 2016
INVENTOR(S) : Greg G. Williams et al.

It is certified that error appears in the above-identified patent and that said Letters Patent is hereby corrected as shown below:

In the Drawings

Figure 5A:
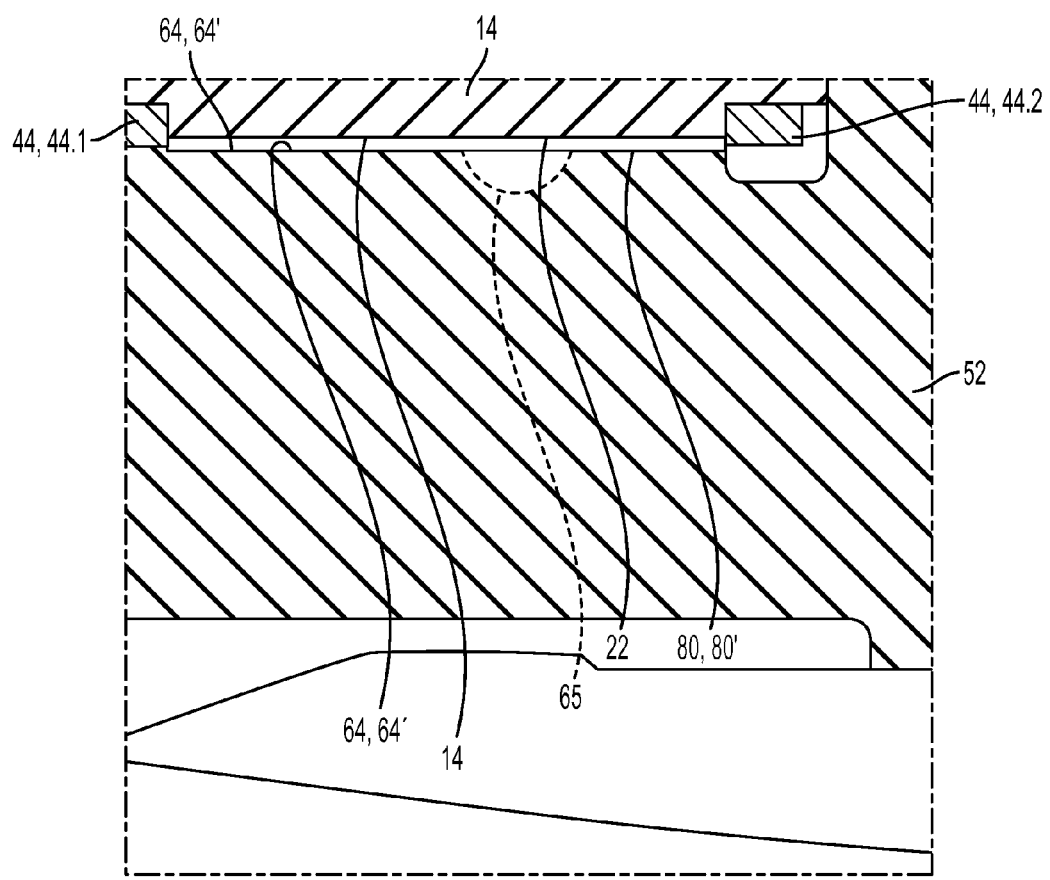
FIG. 5a illustrates an expanded fragmentary portion of the cross-sectional view illustrated in FIG. 5, illustrating an associated isolation annulus.

In FIG. 5:
    the outer boundary of the associated fragmentary view should be drawn with a broken line made up of short dashes.
In FIG. 5a:
    the upper left corner of center body 52 should be chamfered below retention band 44, 44.1, as illustrated in FIGS. 4 and 5;
    the lead line from reference signs 80, 80' should be extended to the midpoint of the associated radial gap 80 / isolation annulus 80'; and
    the lowest sold-curved line horizontally-extending between the left and right sides of the associated fragmentary bounding box should be changed to a broken line made up of short dashes, the boundary of the bounding box below that line should be deleted, and
    the remaining portions of the bounding box should be changed to corresponding broken lines made up of short dashes.

In the Specification

Column 1:
    Line 28, "expanded portion" should be changed to --expanded fragmentary portion--.
Column 6:
    Line 8, "below—described" should be changed to --below-described--; and
    Line 29, "the size" should be changed to --of the sizes--.

Signed and Sealed this
Fifteenth Day of August, 2017

Joseph Matal
*Performing the Functions and Duties of the
Under Secretary of Commerce for Intellectual Property and
Director of the United States Patent and Trademark Office*